May 11, 1943.  C. R. FORDYCE ET AL  2,319,053
HIGH SPEED METHOD OF MAKING CELLULOSE ORGANIC
DERIVATIVE FILM AND SHEETING
Filed Dec. 10, 1938   2 Sheets-Sheet 1

CHARLES R. FORDYCE
WALKER F. HUNTER, JR.
INVENTORS

BY
ATTORNEYS

May 11, 1943.  C. R. FORDYCE ET AL  2,319,053
HIGH SPEED METHOD OF MAKING CELLULOSE ORGANIC
DERIVATIVE FILM AND SHEETING
Filed Dec. 10, 1938  2 Sheets-Sheet 2

CHARLES R. FORDYCE
WALKER F. HUNTER, JR.
INVENTORS
ATTORNEYS

Patented May 11, 1943

2,319,053

UNITED STATES PATENT OFFICE 2,319,053

HIGH SPEED METHOD OF MAKING CELLULOSE ORGANIC DERIVATIVE FILM AND SHEETING

Charles R. Fordyce and Walker F. Hunter, Jr., Rochester, N. Y., assignors to Eastman Kodak Company, Rochester, N. Y., a corporation of New Jersey Application December 10, 1938, Serial No. 245,021

2 Claims. (Cl. 18—57)

This invention relates to a high speed method of making attenuated cellulose derivative products, such as film and sheeting, and more particularly to a method of making such products which is characterized by the use of cellulose organic acid ester compositions of hitherto unknown properties.

As is well known, cellulose derivative sheets or films are ordinarily produced by depositing a cellulose derivative solution or dope in the form of a film on the highly polished surface of a slowly rotating wheel or band, causing the film to set by evaporation of solvent, stripping the film and curing out residual solvent. The dope compositions heretofore employed for this purpose have been solutions which "set" or reach a solid or semi-solid condition, permitting removal from the forming surface only by gradual evaporation of solvent. With such dopes most of the solvent must be removed (leaving not much more than 20-25% of solvent, based upon the weight of the sheet) before satisfactory stripping of the film can be accomplished. This necessitates a relatively long period of preliminary curing on the wheel. Furthermore, the length of time required for proper setting is increased by the fact that, since such dopes remain fluid or semi-fluid until most of the solvent has evaporated (and, therefore, must be supported on the wheel surface), evaporation of solvent can take place only from the outside surface of the deposited film. In addition, such dopes tend to skin over on the outside surface because of more rapid loss of solvent from the upper layers of film material and this further increases the setting time.

The advantages of bringing the film material into a solid or semi-solid condition as early in the film-forming operation as possible are apparent. Obviously, any reduction in the stripping time, that is, the time during which the film must remain on the wheel before it can be properly stripped, directly increases production speed. Moreover, if the film can be removed from the wheel while still containing considerable solvent, more rapid curing can be attained, because under such conditions the film can be so handled and treated as to permit curing out of solvent from both surfaces simultaneously. An additional advantage is that early solidification or colloidization results in a preferred micellar mat-like structure with attendant improvement in the quality of the finished product. The ideal film-forming operation would, therefore, be one in which the dope could be brought, immediately after casting, into a set or non-fluid condition while still containing all, or nearly all, of its original solvent—a condition which would permit almost immediate stripping (thus reducing stripping time to a minimum) and curing solvent from both surfaces of the film simultaneously.

Numerous attempts have been made to realize this ideal. For example, it has been proposed to use mixtures of low and high-boiling solvents in the dope, so chosen that by rapidly evaporating the low boiling component a very concentrated solution of the cellulose derivative in the high boiling component would remain. It has also been proposed to coagulate cellulose derivative solutions by means of non-solvent liquids or vapors. While such expedients have resulted in some improvement, until the advent of the present invention the ideal operation has never been attained.

As a further indication of the state of the art, it may be said that the broad phenomenon of gelation of certain types of cellulose derivative solutions under the influence of temperature change has been observed from time to time by various workers in the cellulosic field. It has been recognized, for example, that certain organic liquids which are non-solvents for cellulose acetate and other cellulose organic acid esters at ordinary temperatures become solvents at elevated or moderately elevated temperatures and that if solutions are formed at the high temperatures and coated on a metal or other surface and cooled down, a tenaciously adhering lacquer coating results. It has also been recognized that by heating a suspension of cellulose acetate in ethylene dichloride (a cellulose acetate non-solvent at ordinary temperatures) to about 30–60° C., the cellulose acetate goes into solution to form a clear solution and when such a solution is coated on a surface, cooled and cured to remove the solvent, a clear transparent film results. In other words, while a hot ethylene chloride solution of cellulose acetate will gel upon coating or casting upon a film-forming surface, this phenomenon does not increase the speed of production of sheeting therefrom because such a film cannot be stripped and handled while containing any more solvent than the ordinary cellulose acetate dope wherein acetone and the like are solvents. In other words the gel so formed is not self supporting. Workers in this field have never gone much beyond a recognition of the phenomenon that certain dopes are capable of gelling and others are not. Until the present invention, no practical application of the phenomenon of gelation to film-forming operations has ever been made.

This invention has as an object to provide a high speed method of making cellulose derivative sheeting adapted for use as photographic film support and for other purposes. A further object is to provide a method of making cellulose organic acid ester film or sheeting by coating or casting a dope on a film-forming surface, characterized by the fact that the film may be removed or stripped from the surface while still containing a large proportion of solvent. A still further object is to provide a method of making such film or sheeting in which film formation takes place almost immediately upon deposition of the dope. Another object is to provide a method of cellulose ester film or sheet formation in which the film can be removed from the forming or casting surface almost immediately after gelation while containing large proportions of solvent and is in such condition that residual solvent may readily be cured out of both surfaces simultaneously. Another object is to produce cellulose organic derivative sheeting having high tensile strength and flexibility and a low swell and shrink amplitude. Other objects will appear hereinafter.

These objects are accomplished by the following invention which, in its broader aspects, comprises dissolving at elevated temperatures or moderately elevated temperatures certain cellulose acetate propionates and cellulose acetate butyrates in a solvent consisting of a mixture of trichloroethylene and ethylene chloride, whereby a solution or dope is obtained which is susceptible of gelation by rapid lowering of temperature to produce a sheet or film having such strength in the gel state that it may be stripped from the casting surface almost immediately after casting and while still containing nearly all or at least a large proportion of the original hot solvent.

We have found that solutions of this character, the composition and preparation of which will be described in more detail hereinafter, possess certain unusual and unexpected characteristics which render them outstanding for the specific purposes of the instant invention. Among other things, (1) they are fluid at temperatures above 50° C.; (2) when allowed to cool to or below a critical temperature between 10°–50° C. (depending upon the composition) they form entirely transparent gels which remain homogeneous throughout the gelling operation, such gelation occurring within approximately 20° C. of the flowable solution point; (3) the gels when first formed do not adhere strongly to surfaces such as metal, glass, etc.; (4) the gels are sufficiently strong and resistant to deformation that they can be handled while still containing large quantities of solvent, i. e., an amount of solvent equal to or greater than the weight of the cellulose ester; (5) the nature or structure of the gels is such that they readily release their volatile solvents and the solvent can be driven off without employing high temperatures.

Inasmuch as it is necessary only to coat or cast the warm solution, cool, and strip almost immediately (due to the fact that the cold-setting or gelation effect produces at once a strong tough gel), an unusual and wholly unexpected increase in film-forming speed is attained. When one takes into account the fact that ordinary film-forming processes generally involve the use of dopes which require in some cases as much as fifteen or twenty minutes preliminary curing on the casting wheel or other surface before the material reaches a stage in which it can be successfully stripped, the tremendous increase in manufacturing speed made possible by the present method will be apparent.

In the following examples and description we have set forth several of the preferred embodiments of our invention, but they are included merely for purposes of illustration and not as a limitation thereof.

Figure 2:
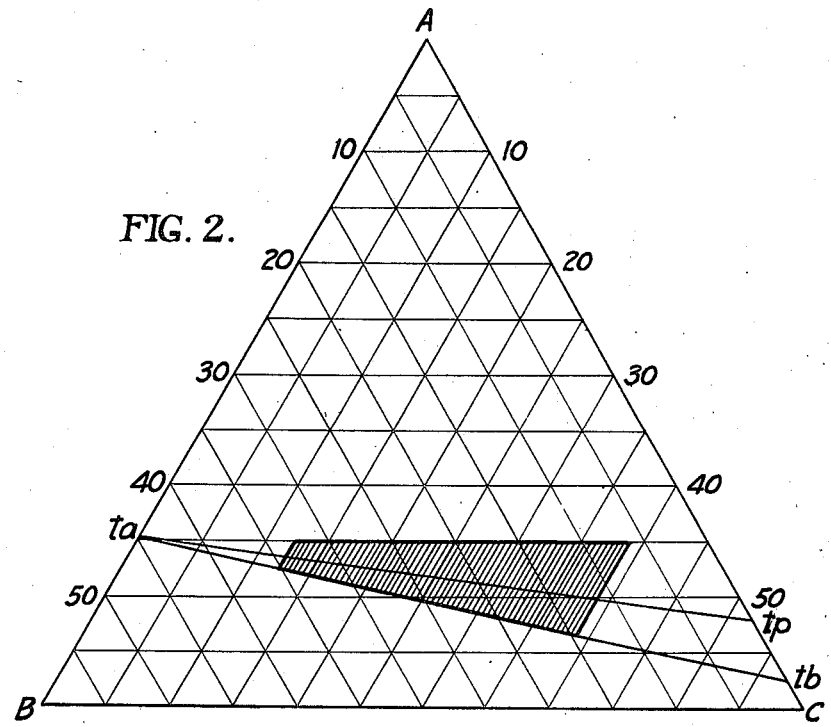
Fig. 2 is a chart showing graphically the various cellulose organic acid esters which may be employed within the teaching of our invention.

Referring first to Fig. 2 it is a triangular chart to identify the chemical composition of the cellulose esters under consideration. The composition in per cent acetyl is plotted along the line "AB" and the per cent higher acyl (such as propionyl or butyryl) is plotted along the line "AC." The points "ta," "tp" and "tb" represent cellulose triacetate, tripropionate and tributyrate, respectively. The line connecting "ta" and "tb" represents fully esterified mixed esters of acetic and butyric acid and the line connecting "ta" and "tp" represents fully esterified mixed esters of acetic and propionic acids. Hydrolyzed mixed esters fall within the areas lying above the fully esterified products.

On this chart is outlined a shaded area representing the cellulose organic acid esters susceptible of forming solutions of the gelation type in mixtures of trichloroethylene and ethylene chloride in accordance with our invention.

In order to prepare a solution of the cellulose mixed ester within this area which will exhibit the property of forming a gel upon allowing the warm solution to cool, it is desirable to employ the optimum proportions of trichloroethylene and ethylene chloride suitable for the particular composition of cellulose ester to be used. In the regions of lower propionyl or butyryl content lying near the left-hand boundaries of the shaded area solvent mixtures composed of from approximately 40–60% ethylene chloride should be employed. With cellulose esters of greater higher acyl content, more nearly approaching the right-hand boundaries of the shaded areas, minor quantities of ethylene chloride constituting, for example, 10 to 30% of the solvent mixture, should be employed. For example, a suitable solution of a cellulose acetate propionate of 29% acetyl and 15% propionyl content would be obtained by use of a solvent mixture composed of 50% trichloroethylene and 50% ethylene chloride, while if a cellulose ester of 22% acetyl and 29% butyryl content were to be used, a solvent mixture of 90% trichloroethylene and 10% ethylene chloride would be preferred.

It will be understood from the chart of Figure 2 that the cellulose acetate propionates and cellulose acetate butyrates employed in accordance with our invention are those containing not less than about 12% higher acyl and not greater than about 39% higher acyl and of not less than 45% total acyl content. Cellulose esters of less than 12% higher acyl content, lying to the left of the shaded area, or those hydrolized to a total acyl content of less than 45%, lying above the shaded area cannot be employed in these compositions because they are insoluble in the solvent mixtures even at elevated temperatures. Cellulose esters of more than 39% higher acyl content, on the other hand, are soluble in the solvent mixtures even at room temperature and will not produce the desired gelation characteristics.

It will be understood that the compositions defined as above and by reference to the shaded area of the chart of Fig. 2 are not absolute, since solutions of the gelation type may be obtained, in accordance with our invention, by employing cellulose mixed organic acid esters which fall slightly without the boundaries of this area. Those skilled in the art will of course appreciate the fact that in such cases there is always a border land or twilight zone extending beyond the specifically indicated boundaries in which certain operative compositions will fall. For optimum results, however, one should select esters which fall well within the boundaries of the shaded area of Fig. 2.

Plasticizers may be used in varying quantities in the above compositions and have a minor effect upon the gelation behavior. Use of triphenyl phosphate in quantities as high as 25% of the weight of the cellulose ester does not produce any measurable change in gelation temperature, stripping time, or other phases of the film-forming operation. Liquid plasticizers used in large quantities usually require a minor adjustment in solvent mixtures, such as a decrease in the quantity of more active solvent by 5–10%.

We have referred to the viscosity characteristics of the various compositions adapted for use in our process, and it is accordingly desirable at this point to describe the method by which viscosity is measured. This is a modification of the widely used "dropping ball method," the procedure being as follows:

The dope under examination is filtered and poured into a test tube having a depth of 150 mm., a diameter of 15 mm. and containing a steel ball $\frac{3}{16}$" in diameter weighing .4400 gram. The tube is filled to the brim with the dope under test and a cork stopper inserted with pressure enough to force air bubbles and excess dope past the cork. A small wire may be placed alongside the cork to facilitate the passage of air bubbles and dope past the stopper. The glass tube carries two scratches positioned exactly 10 cm. apart. The dope-filled tube is then placed vertically in a constant temperature water bath with the stopper down. After the bath and tube have reached equilibrium temperature (usually within a period of one-half to one hour), the tube is quickly inverted and placed in a vertical glass cylinder placed in the water bath. When the bottom of the steel ball reaches a position level with the first scratch, a stop watch is started and the time required for the bottom of the steel ball to reach a position level with the second scratch is measured. The viscosity is recorded as the time in seconds required for the ball to travel this 10 cm. distance between the two scratches.

The viscosities referred to in the specification and in the claims are to be understood as having been determined by the above-described method.

Before proceeding to specific examples of our process it is desirable to describe the general aspects of a typical film or sheet-forming procedure and one type of appropriate apparatus for carrying it out.

Figure 1:
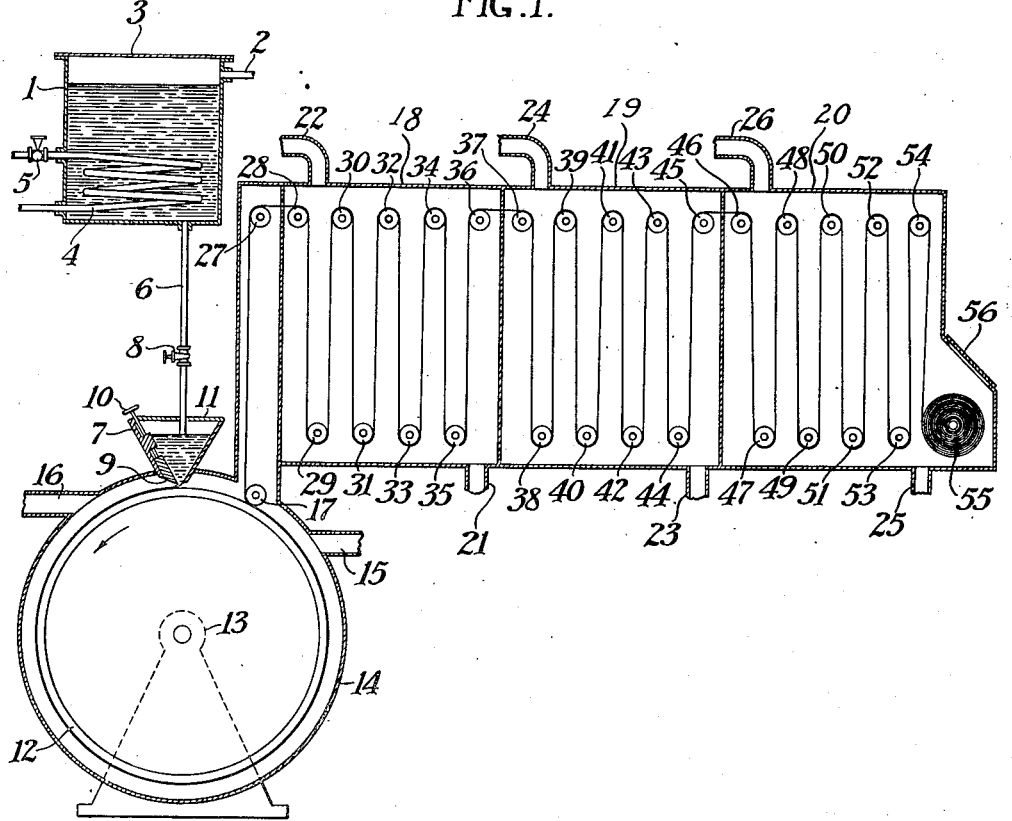
Fig. 1 is a diagrammatic elevational sectional view of a conventional type of device which may be employed for carrying out a typical film-forming operation in accordance with our invention.

Referring to Fig. 1 of the drawings, numeral 1 designates a dope storage or supply tank provided with an inlet conduit 2 for admission of the previously prepared dope. The tank is provided with a removable cover 3 for permitting inspection of the contents and for other purposes and also provided with a heating coil 4 through which a flow of an appropriate heating fluid such as hot water or steam is maintained by means of thermostatically controlled valve 5. The flow of the heated fluid is so regulated as to maintain the dope in the tank 1 at a constant temperature.

Numeral 6 designates a feed conduit (which may be provided with lagging of an appropriate type for preventing heat losses as far as possible) through which the heated dope is passed to a standard form of dope hopper 7, flow of the dope being controlled by means of valve 8.

The dope hopper is provided with an adjustable gate member 9 for controlling the thickness of the dope stream which flows from the hopper. Adjustment of the gate member 9 may be by thumb screw 10 threaded through one wall of the hopper. The hopper is provided with a cover 11 to prevent solvent and heat losses and is also preferably supplied with external or internal heating means (not shown) for maintaining the dope at a constant temperature.

Positioned below the hopper 7 is the coating or casting wheel 12 mounted in suitable bearings 13 and surrounded by air casing 14, the wheel being adapted to rotate in the direction indicated by the arrow. The wheel is provided with appropriate cooling means (not shown) whereby its film-forming surface is cooled to an appropriate temperature equal to or below the gelation temperature of the particular dope employed in a given film-forming operation. Casing 14 is provided with air inlet conduit 15 and outlet conduit 16 for conducting a current of heated air around the wheel counter-currently to the path of the film undergoing formation.

The wheel is driven by appropriate mechanism (not shown) of such nature that any desired rotational speeds may be attained. Numeral 17 designates a conventional stripping roll over which the formed film passes on its way to the curing device, which comprises a plurality of air sections 18, 19, and 20. These air sections are provided, respectively, with air inlet conduits 21, 23, and 25 and with air outlets 22, 24, and 26 which provide a means of conducting heated air through each section in the general direction indicated by the arrows.

Numeral 27 designates a guide roll over which the film passes, after leaving stripping roll 17, on its way to the first air section. Numerals 28, 29, 30, etc., designate a series of rolls in the respective air sections over which the film or sheet material passes on its way to the wind-up 55 located in the last air section 20. These rolls are driven, preferably by means of the so-called tendency drive which permits the film to travel through the air section in a substantially freely supported condition, this type of drive compensating for any longitudinal changes of dimension which may take place in the film material during the curing operation.

The numeral 56 designates a hinged door which gives access to the last air section 20 and through which rolls of the finished product may be removed from time to time.

A typical film-forming operation may be carried out as follows:

An appropriate dope composition, previously thoroughly mixed in another container at an appropriate temperature, is fed into the mixing tank 1 through the conduit 2. Care is taken to maintain the dope, prior to contact with the wheel surface, at a temperature well above its gelation point and in a readily flowable condition. The warm dope passes by means of conduit 6 into dope hopper 7 from which it flows onto the wheel in a stream, the thickness of which is regulated by appropriate adjustment of gate member 9 to give the desired eventual film thickness, for example, .005 inch.

As previously indicated, the wheel surface is maintained at a temperature equal to or below the gelation temperature or temperature range of the particular dope in question and the wheel is driven at such a peripheral speed as to give the desired speed of film formation. As the dope contacts the cold wheel surface gelation takes place almost immediately, and, at the expiration of a substantially insignificant period of time, the film material has reached a condition in which it may be removed from the wheel at the stripping roll 17. Although it is not necessary to subject the film to any considerable amount of curing on the wheel, it is generally best to remove a certain amount of solvent from the gelled film material at this point in the process. To this end air is admitted to wheel casing 14 through conduit 15 and passes countercurrently around the outside surface of the film, the solvent-laden air being finally conveyed out of the apparatus through conduit 16. The air temperature may be adjusted to or below room temperature or it may be heated to as high as approximately 40° C. or over, the particular temperature depending upon the composition of the dope in question, the wheel speed, and various other factors.

The nature of the dope being such that it sets almost immediately into a rigid gel upon contacting the cold wheel surface, the film may be readily stripped upon reaching stripping roll 17. At this point the film contains a substantial amount of solvent, the exact amount, of course, being dependent on wheel speed, temperature of the casing air and other factors. As will be apparent, when it is practical to operate the wheel at a sufficiently high speed, the film may be removed from the film-forming surface while still containing practically all of its original solvent. Under no circumstances is it necessary to bring the solvent content down to a point below that at which the weight of the solvent equals the weight of the cellulose organic acid ester. Under ordinary circumstances the wheel is operated at such a speed that the film contains anywhere from 50% to 80% of solvent at the time of stripping.

After stripping, the film is conducted into the first air section 18, where it is subjected to the action of a current of air heated, for example, to about 40–60° C. Solvent is removed progressively with travel of the film through the air section. The film upon emerging from the first air section passes immediately into the next air section where it is subjected to the action of air heated to a temperature of about 40–80° C. and finally into the air section 20, where it is subjected to the action of air heated from about 85–95° C. By the time the film reaches the wind-up 55 it has lost substantially all of its original solvent content and is then in suitable condition for use as photographic film support and many other purposes.

Our invention will be more readily understood by reference to a number of specific examples illustrating preferred embodiments thereof.

*Example 1.*—A solution of 100 parts by weight of a cellulose acetate propionate of 29% acetyl and 16% propionyl content in 450 parts by weight of a solvent mixture composed of 50% by weight of trichloroethylene and 50% ethylene chloride was prepared by mixing the ingredients with continued stirring at 60° C. A portion of the solution was coated in a thin layer of uniform thickness onto a highly polished film-forming surface having a temperature of about 20° C. The solution set almost immediately to a rigid gel under the influence of the lower temperature. The material was allowed to stand in a current of air at approximately 20° C. for six minutes, whereupon it was stripped from the surface and cured to remove volatile solvent. The resulting clear, transparent film was .005 inch in thickness, and was found by test to be of superior tensile strength and flexibility to similar films cast by the customary evaporative method from acetone solution.

*Example 2.*—A solution of 100 parts by weight of a cellulose acetate propionate containing 28% acetyl and 18% propionyl content in 500 parts by weight of a solvent mixture composed of 60% by weight of trichloroethylene and 40% ethylene chloride and containing 10% triphenyl phosphate, based on the weight of the cellulose ester, was prepared by mixing the ingredients with continued stirring at 60° C. The solution was then filtered to remove incompletely dissolved particles and fed to the supply tank of a film-forming apparatus such as illustrated in Fig. 1. The temperature of the dope in the tank was maintained at 50° C.

The dope was admitted to the hopper where its temperature was maintained at about 45° C. The gate of the hopper was so adjusted as to feed a stream of the warm dope to the cold wheel surface in such an amount as to give an eventual film thickness of .005 inch, the wheel being maintained at a constant temperature of about 20° C. The wheel was rotated at a speed such that the film remained on the film-forming surface for about three minutes during which time a current of air having an inlet temperature of about 50° C. was passed through the space around the wheel in a direction counter-current to that of the movement of the film.

The warm dope, immediately upon coming in contact with the cold wheel surface, was transformed into a non-fluid gel. After completing somewhat more than three-quarters of a revolution on the wheel, the film was stripped from the film-forming surface and was thereafter carried through the three air sections where it was subjected to the curing action of a current of moderately heated air. The air passing through the first air section had an inlet temperature of about 50° C. providing an average temperature in the section of 45° C. The path and speed are such that the film in this section took approximately 16 minutes to travel therethrough. The average temperature of the second air section was 65° C., and of the third section 80° C., the path and speed of the film being such that any given portion thereof remained in these air sections for a period of approximately 16 minutes.

The film at the point of stripping was found to contain about 60% solvent under the particular conditions of coating. The finished film was found to have high tensile strength, high flexibility, and a low swell and shrink amplitude.

Example 3.—Using the procedure similar to that outlined in previous examples, a solution of 100 parts of a cellulose acetate butyrate of 22% acetyl and 29% butyryl content was prepared in 500 parts by weight of a solvent mixture composed of 90% by weight of trichloroethylene and 10% of ethylene chloride at 60° C. The resulting solution when applied to a casting surface at 20° C. could be removed after one minute at which time it still contained considerably more than 50% solvent.

The resultant film after evaporation of volatile solvents exhibited good tensile strength, high flexibility, and a low swell and shrink amplitude.

When the same cellulose ester was dissolved in similar concentration in a solvent mixture composed of 80 parts by weight of trichloroethylene and 20 parts of ethylene chloride, a casting surface of about 15° C. was necessary and it could be removed from the casting surface after 4.5 minutes.

Example 4.—A solution prepared from 100 parts of a cellulose acetate propionate of 22% acetyl and 26% propionyl content in 400 parts by weight of a solvent mixture composed of 70% trichloroethylene and 30% ethylene chloride was prepared at 60° C. and when coated upon a film-forming surface at 10° C. exhibited a maximum stripping time of five minutes.

Example 5.—A solution composed of 100 parts of a cellulose acetate butyrate of 16% acetyl and 36% butyryl content in 500 parts by weight of a solvent mixture composed of 90% trichloroethylene and 10% ethylene chloride was prepared at 60° C. and the stock solution allowed to cool to approximately 40° C. When the solution at this temperature was allowed to flow on a casting surface at 10° C. in a thickness such that the cured film was approximately .005 inch thick the film while still containing a large proportion of solvent could be removed from the casting surface after five minutes.

It will of course be understood that the particular film-forming composition employed in a given case will depend upon such practical matters as the temperature of the casting surface which it is desired or practical to employ, the temperature at which the cellulose ester may be placed in solution and various other factors. For example, as the proportion of ethylene chloride in the solvent mixture is increased for a given cellulose ester, the lower will be the temperature of the casting surface required to produce gelation. On the other hand, as the proportion of ethylene chloride in the solvent mixture is decreased, the higher will be the temperature necessary to obtain solution of the cellulose ester material.

Of the above mentioned solutions we have found the compositions of Examples 1, 2, and 3 to be outstanding in their ability to give satisfactory photographic film base when employed in accordance with our invention.

In this connection, it is important to note that the matter of permissible solvent content at stripping is one of the distinguishing features of our invention. Film or sheet material produced according to the above-mentioned prior art method must be cured on the film-forming surface until residual solvent is reduced to or below about 10-20% before satisfactory stripping can be attained. Our compositions, on the other hand, are of such nature that they may be satisfactorily stripped from the film-forming surface while containing anywhere from 50 to 80% solvent. It will thus be seen that the film or sheet material of the instant invention is of a fundamentally different nature than similar products produced from the non-gelling types of dope of the prior art.

One of the most outstanding differences between films or sheets produced in accordance with our invention, and similar prior art products, is the fact that they have an extremely low "swell and shrink amplitude," that is, the property of undergoing linear dimensional change in alternately wet and dry condition. As is well known, the swell and shrink characteristics of a photographic film, for example, are of great importance and the most useful films are those having the lowest swell and shrink amplitude. This is of particular importance in films which are to be used for X-ray, portrait, or aerial photography where sheets of appreciable size are employed. Obviously films of high swell and shrink characteristics tend toward internal unevenness which is due, either to buckling of the film in the center, or to curling of the edges—phenomena which are absent from films having a low swell and shrink amplitude and the ability to lie flat without curling. Other types of film which are used in long strips, such as rolls of Cine films, are difficult to process—such materials if of high swell and shrink characteristics, exhibiting appreciable shrinkage after removal from developing or washing solutions, at which time the films are usually mounted on a drying rack. Under such conditions these films tend to become severely tightened resulting in distortion of the film base and the photographic image carried thereby.

Figure 3:
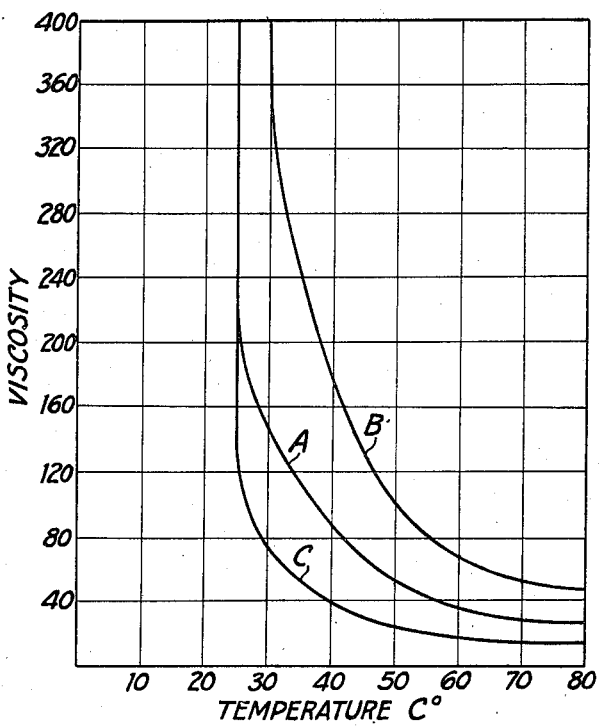
Fig. 3 is a graphical representation of the viscosity changes which occur when certain typical compositions of our invention are cooled from their solution temperatures to or below their gelation temperatures or temperature ranges.

The nature of our film-forming composition will be more readily understood by reference to Fig. 3 of the drawings which illustrated graphically the change in viscosity which our solutions undergo upon lowering the temperature. Curve A was plotted from viscosity determinations made at various temperatures upon a film-forming solution composed of 100 parts of a cellulose acetate propionate of 29% acetyl and 16% propionyl content in 500 parts of a solvent mixture of 60% trichloroethylene and 40% ethylene chloride. It will be noted that the curve rises gradually as the solution is cooled from 70° C. and that upon approaching the temperature range of 30° to 45° C., a very marked increase in viscosity takes place. Continued cooling below about 25° C. results in extreme viscosity and gelation with the production of a rigid non-fluid mass. By employing varying concentrations of the cellulose ester in solution, the character of the curve is found to change somewhat. A more concentrated solution of the same cellulose ester in the same solvent combination would give a curve of the type "B," while a lower concentration of the cellulose ester would give curve C.

It will be apparent that many additions to and variations in the above-outlined procedure are possible within the scope of our invention. For example, one may increase the temperature at which gelation will occur for a given solvent combination by increasing the proportion of trichloroethylene of the solvent composition.

It will be seen from the above examples that no hard and fast rules can be laid down as to the composition of our film-forming solutions for all purposes, since the composition of a given solution will be adjusted in accordance with the particular conditions of coating, stripping and curing which are to be employed. In general, it may be said that for a practical process a given composition should be, in accordance with our invention, such that the cellulose derivative in question goes into solution at temperatures at or above 50° C. and remains fluid above that temperature. It should also be seen that upon cooling it experiences a rather sharp increase in viscosity within a comparatively narrow temperature range of about 20° C.

It will be apparent that in a practical film-making operation many variations in the solution temperature, wheel temperature, wheel casing air temperature, curing temperature, wheel speed, and many other details of the process may be made within the scope of our invention. As previously indicated, when employing compositions which are solutions above 50° C., the wheel temperature may be in the neighborhood of 10° to 20° C., or at least sufficiently low to bring the dope to, and preferably below its gelation temperature.

At this point it may be well to discuss gelation temperature. By this term we do not necessarily refer to an exact temperature, but rather to a maximum temperature below which the cooling solution or dope undergoes a marked and rather sudden increase in viscosity. While no exact maximum can be specified which will cover all possible cases, we may say that gelation or solidification of those compositions which we have found most satisfactory takes place at temperatures below about 40° C.

The temperature of the wheel casing air, that is, the temperature employed to effect initial curing may also vary, as may the temperatures employed for curing after stripping. It is one of the advantages of our invention, however, that due to the peculiar character of our film-forming compositions which enables them to readily lose solvent, curing may be effected at considerably lower temperatures than those customarily employed in film-making operations.

In general, the curing after stripping of sheet or film material produced in accordance with our invention may be carried out as set forth above by standard curing procedures, that is, by conducting the material through appropriate curing chambers where it is subjected to the action of air maintained at elevated or moderately elevated temperatures. It is desirable to subject the film material to low tension during the curing operation in order that the final product may have the desired physical properties. In fact, the sheet or film material produced in accordance with our invention should be subjected to the least tension possible during curing. This will be particularly desirable in those cases in which the film, after stripping, contains a very high proportion of the original solvent content.

Although our process finds particular application in the manufacture of photographic film support, it is broadly applicable to the manufacture of other types of sheeting, particularly thin sheeting adapted for wrapping purposes.

Our process has many advantages over known film-making processes, but the most outstanding advantage is the tremendous increase in speed of film formation obtainable thereby. While we have referred to stripping times of anywhere from a minute or two to five or six minutes, there is no actual theoretical limit to the stripping time, short of zero. In other words, according to our process, film or sheeting may be stripped almost immediately after coating. It will be appreciated, however, that the actual speed of a given practical film-making operation will be considerably lower than that theoretically obtainable. The operation may be slowed down by the practical necessity or desirability of applying various subbing or backing treatments to the film support during the manufacturing operation. As a general proposition, it may be stated that the film-making speeds obtainable by our process are far beyond anything which has thus far been obtained in the film-making industry. For example, anywhere from ten to twenty minutes are required to cast and strip a film under published procedure, whereas film may be cast and stripped by our process within a minute or even less from the time of deposition of the film-forming composition.

One of the distinguishing and unusual features of our invention is the fact that, due to their peculiar composition and characteristics, satisfactory gelling of our film-forming compositions is quite independent of the thickness of the deposited layer, although the thicker the layer, the lower is the casting speed due to the relatively lower heat transference of thick layers as compared to thin layers. We may, however, produce films or sheets anywhere from a few ten thousandths inches or less to almost any desired thickness. It will thus be seen that our process is adapted, not only for the manufacture of photographic film support and even much thinner types of sheeting, such as those employed for wrapping purposes, but also for the manufacture of sheets adapted for use in the fabrication of laminated glass, container stock, and many other products.

What we claim is:

1. A high speed gelation process of making sheeting suitable for photographic film base which comprises dissolving at a temperature above 50° C. a cellulose mixed organic acid ester selected from the group consisting of cellulose acetate propionates and cellulose acetate butyrates containing not less than about 12% and not greater than about 39% higher acyl and containing not less than 45% total acyl, said esters having the composition indicated by the shaded area of Fig. 2 of the drawings, in a liquid which is a solvent for the said cellulose ester only at a temperature above 50° C. and in a weight of such liquid greater than the weight of the cellulose ester dissolved, which will give a solution which at a temperature within the range of 10–50° C. will form a clear, transparent, self-supporting gel and which liquid is composed of a mixture of trichloroethylene and ethylene chloride, casting the solution from a supply thereof having a temperature above its gelation temperature in the form of a film at a temperature of 10–50° C. on a film-forming surface, stripping the film from the film-forming surface while containing at least 50% solvent and removing residual solvent from the film.

2. A gelable composition comprising a cellulose mixed organic acid ester selected from the group consisting of cellulose acetate butyrates and cellulose acetate propionates containing not less than about 12% and not more than about 39% higher acyl and containing not less than about 45% total acyl, said cellulose esters having the composition indicated by the shaded area of Fig. 2 of the drawings, dissolved in a liquid which is a solvent for the said cellulose ester only at a temperature above 50° C., said liquid being composed of a mixture of trichloroethylene and ethylene chloride, and said liquid being of a weight, greater than the weight of the cellulose ester dissolved, which will give a solution which will form a clear, transparent, self-supporting gel at a temperature within the range of 10–50° C. which at that temperature is sufficiently strong and resistant to deformation to permit handling while containing more than 50% solvent.

CHARLES R. FORDYCE.
WALKER F. HUNTER, Jr.